(12) United States Patent
Song et al.

(10) Patent No.: US 6,850,639 B2
(45) Date of Patent: Feb. 1, 2005

(54) COLOR SPACE QUANTIZATION DESCRIPTOR STRUCTURE

(75) Inventors: Jung Min Song, Seoul (KR); Hyeon Jun Kim, Seongnam (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 09/740,847

(22) Filed: Dec. 21, 2000

(65) Prior Publication Data

US 2001/0005426 A1 Jun. 28, 2001

(30) Foreign Application Priority Data

Dec. 27, 1999 (KR) .......................... 1999-62844
Mar. 7, 2000 (KR) .......................... 2000-11333

(51) Int. Cl.[7] ................................ G06K 9/00
(52) U.S. Cl. ................ 382/162; 165/209; 165/251; 348/422.1; 348/27
(58) Field of Search ................ 382/165, 170, 382/305, 162, 187, 198, 203, 209, 217, 232, 240, 251, 270, 271, 272, 273; 348/405.1, 414.1, 418.1, 422.1, 573.27

(56) References Cited

U.S. PATENT DOCUMENTS

| | | | |
|---|---|---|---|
| 5,049,986 A | * | 9/1991 | Aono et al. .................. 358/522 |
| 6,463,173 B1 | * | 10/2002 | Tretter ......................... 382/168 |
| 2001/0017940 A1 | * | 8/2001 | Kim et al. .................... 382/162 |
| 2003/0044062 A1 | * | 3/2003 | Ganapathy et al. ......... 382/165 |

FOREIGN PATENT DOCUMENTS

JP 04-370881 12/1992

OTHER PUBLICATIONS

Gan, Qing, Kazunori Kotani and Makoto Miyahara, "Quantizing Qccuracy for High Quality Color Impage Processing," vol. J76D–II No. 9, pp. 1902–1909, Sep. 1993.

Milyahara, Makoto, Kazunori Kotani, and Yuukou Horita, "Uniform Lightness–Chromaticness Color Space and High Quality Systematic Image Coding," vol. 15, No. 70, pp. 1–8, Nov. 22, 1991.

Ohm, Jens–Rainer, and Bela Maki, "Descriptors for Color in HSV Color Space (Proposals P563 and P564)," URL: http://www.ient.rwth–aachen.de/team/ohm/publi/p563.pdf, Feb. 1999.

Abdel–Mottaleb, M., et al., "MPEG–7: A Content Description Standard Beyond Compression," IEEE, Aug. 1999, pp. 770–777.

Park, Du–Sik, et al., "Image Indexing Using Weighted Color Histogram," IEEE International Conference on Image Analysis and Processing, Los Alamitos, CA, Sep. 27, 1999, pp. 909–914.

* cited by examiner

*Primary Examiner*—Bhavesh M. Mehta
*Assistant Examiner*—Ali Bayat
(74) *Attorney, Agent, or Firm*—Fleshner & Kim, LLP

(57) ABSTRACT

The present invention relates to a color space quantization descriptor structure for performing quantization of a color space in order to search a multimedia based on contents when multimedia feature information is color information, particularly when the multimedia feature information is the color information and the search is about a moving image or a still image, the color space quantization descriptor structure according to the present invention has a tree structure divided into a plurality steps of superior color spaces and subordinate color spaces, and the tree structure recursively comprises a plurality of subordinate color spaces. Accordingly, the present invention can improve performance of a still image and a moving image search apparatus, perform the quantization of a n dimensional color space such as a H, S, V, RGB, HMMD color space etc., and perform the different step quantization corresponding to each feature.

13 Claims, 8 Drawing Sheets

COLOR SPACE QUANTIZATION DESCRIPTOR STRUCTURE

BACKGROUND OF THE INVENTION

1. Field of the Invention

The present invention relates to a color space quantization descriptor structure for performing quantization of a color space in order to search a multimedia based on contents when multimedia feature information is color information, in particular to a color space quantization descriptor structure comprising quantization description information which has a tree structure divided into a plurality steps of superior color spaces and subordinate color spaces, and the tree structure recursively includes a plurality of subordinate color spaces.

2. Descriptor of the Prior Art

In the conventional technology, in order to search a multimedia based on contents, particularly in order to search a still image or a moving image, the search is performed by using feature information of the image such as color information, texture information, shape information or time-change information of the image.

In order to search the image, using the color information for describing the characteristics of an image is very useful for searching the multimedia based on the contents.

In particular, describing the color information of one pixel or group of pixels is the basic method for constructing a digital image.

When the color information is described on the each pixel (or group of the pixels), a color element value is differed in accordance with a certain color space (for example, HSV (Hue Saturation Value) color space, RGB (Red Green Blue) color space etc.) to represent the characteristics of an image in more effective way according to its usage.

As described above, in order to use the color information of the image for searching the multimedia based on the contents, a process on the color information of the each pixel according to a certain method is required. As a representative method there is a color histogram for grasping distribution of the color information displayed on the overall images.

In order to construct the color histogram, dividing the color space into a plurality of parts is required, that is the quantization of the color space.

The color space quantization is to divide the color space which is represented as a three dimension or a four dimension etc. into subordinate color spaces, it uses such characteristics that colors which are adjacent to each other within the color space looks similar to eyes of human.

The color space quantization is needed for searching the still image or moving image based on the color information, and the color space quantization is useful in speed efficiency and storage efficiency of the search.

In the speed efficiency aspect, when the all color information which is allotted to the each pixel are used in matching of the image, it is difficult to perform the matching and it increases computing complexity.

Accordingly, the whole image or the part of it is described by the color histogram. Herein, when the color histogram is formed by the information of the quantization of color space, the amount of color information used for the matching is smaller than the original image where the color information is allotted to the each pixel, accordingly the computing complexity is decreased.

In addition, in the storage efficiency aspect, the storage space allotted to the each image is reduced by the compaction of the information.

There is a uniform quantization, a non-uniform quantization, and a lookup table for performing the quantization in the conventional method.

The uniform quantization method divides the color space into the subordinate color spaces with a uniform interval on each axis constructing the color space.

Process of the uniform quantization method is very simple, and it is efficient in the speed aspect when the two images represented as the uniform quantization are matched. On the contrary, when the original color space has non-uniform characteristics, the characteristics of the color space is not reflected well, accordingly the search performance becomes worse.

Meanwhile, the non-uniform quantization divides the color space into the subordinate color spaces with a non-uniform interval on the each axis constructing the color space. The non-uniform quantization method is inferior to the uniform quantization method in terms of complexity, but it is superior in terms of searching performance because it performs the non-uniform quantization of the color space which shows non-uniform characteristics in itself.

In addition, the lookup table quantization method directly describes the upper limit and lower limit of the axis of each subordinate color space, which doesn't need any quantization operation required for the uniform quantization and non-uniform quantization.

The lookup table quantization method is very efficient in the search ability or speed aspect, but a search apparatus should always keep the lookup table requiring large amount of storage.

Accordingly, the color space quantization method which can reflect well the substantial characteristics of the color space, is efficient in terms of complexity, and have high search performance is required.

In addition, the color space quantization descriptor structure which can describe the color space quantization information precisely and simply and, at the same time, is compatible with various search engine is required. However, as described above, the conventional color space quantization technology performs the quantization with the quantization information of the final one step obtained by simply dividing the color space uniformly or non-uniformly, accordingly the substantial characteristics of the color space can not be reflected properly.

In addition, the conventional color space quantization technology performs the quantization with the quantization information of the final one step obtained by simply dividing the color space uniformly or non-uniformly, accordingly it is not efficient in terms of the quantization speed or matching speed.

In addition, the conventional color space quantization technology performs the quantization with the quantization information of the final one step obtained by dividing the color space uniformly or non-uniformly, accordingly it can not have high search performance in the multimedia search based on content.

In addition, the conventional color space quantization technology performs the quantization with the quantization information of the final one step obtained by dividing the color space uniformly or non-uniformly, accordingly it can not simply and accurately describe the color space quantization information while making it compatible in the various search engine.

SUMMARY OF THE INVENTION

Accordingly, the object of the present invention is to provide a color space quantization descriptor structure which is capable of performing quantization reflecting characteristics of the color space properly in order to search a multimedia based on content when the multimedia is represented by color information and the target of the multimedia search is moving image or still image.

The other object of the present invention is to provide the color space quantization descriptor information structure which is capable of improving speed of the quantization process and image matching process for searching the multimedia based on the contents when the multimedia is represented by the color information and the target of the multimedia search is the moving image or still image.

The other object of the present invention is to provide the color space quantization descriptor information structure which is capable of improving the search performance of a still image or a moving image search apparatus in order to search the multimedia based on the contents when the multimedia is represented by the color information and the target of the multimedia search is the moving image or still image.

In order to achieve the above-mentioned objects, a color space quantization descriptor structure comprises quantization description information of the color space which has a tree structure divided into a plurality of superior color spaces and subordinate color spaces, and the tree structure recursively comprises a plurality of the subordinate color spaces in order to search the multimedia based on the contents when the multimedia is represented by the color information and the target of the multimedia search is the moving image or still image.

In order to achieve the above-mentioned objects, the quantization description structure of the color space comprises information for performing uniform quantization or non-uniform quantization of the subordinate color spaces in order to search the multimedia based on the contents when the multimedia is represented by the color information and the target of the multimedia search is the moving image or still image.

In order to achieve the above-mentioned objects, the subordinate color space structure of the quantization description information constitutes a certain set of consecutive color spaces in order to search the multimedia based on the contents when the multimedia is represented by the color information and the target of the multimedia search is the moving image or still image.

In order to achieve the above-mentioned objects, the subordinate color space structure of the quantization description information constitutes a certain set of consecutive color spaces and performs a scalable quantization description in order of the volume of the limit range of the color spaces within the certain set in order to search the multimedia based on the contents when the multimedia is represented by the color information and the target of the multimedia search is the moving image or still image.

In order to achieve the above-mentioned objects, the quantization description information of the color space has a tree structure divided into a plurality steps of superior color spaces and subordinate color spaces, comprises quantization type information for representing the uniform quantization or non-uniform quantization, comprises information for representing the number of component (num_component) constituting the color space, comprises information for representing the limit range of the divided each subordinate color space, and comprises information for representing the number of division of the color space in the uniform quantization in order to search the multimedia based on the contents when the multimedia is represented by the color information and the target of the multimedia search is the moving image or still image.

In order to achieve the above-mentioned objects, when the information for representing limit range of the color space and information for representing the number of the division of the uniform quantization color space further comprise information for representing the persistent axis of the color space which is described by more than 1 and less than component number (num_component).

DETAILED DESCRIPTION OF THE PREFERRED EMBODIMENT

Hereinafter, the embodiments of the present invention will now be described in detail with reference to accompanying drawings.

Figure 1:
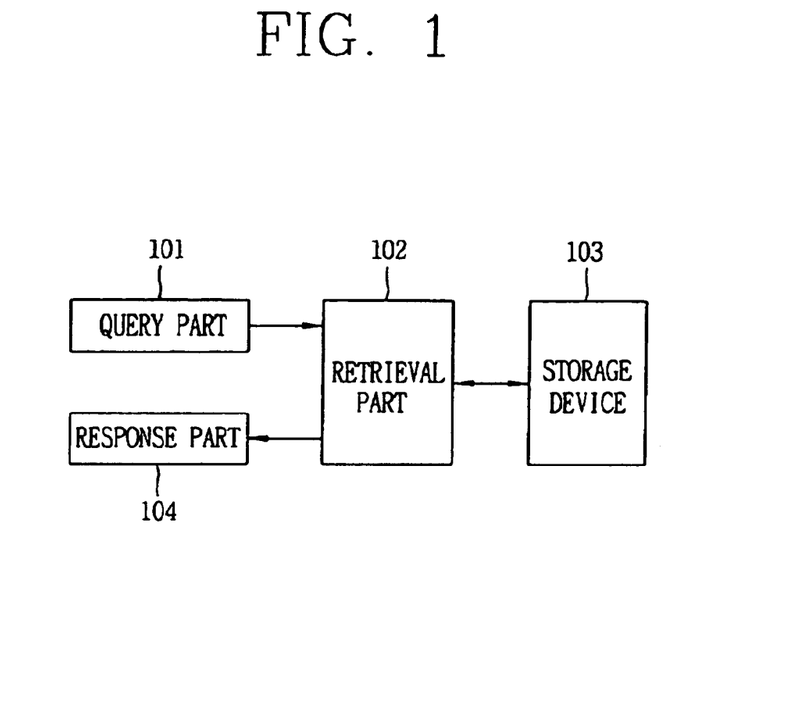
FIG. 1 illustrates a search apparatus for searching a multimedia based on contents in accordance with the present invention.

FIG. 1 is a block diagram illustrating a multimedia search apparatus for searching a multimedia based on the content in accordance with the present invention.

In other words, it illustrates the example of the still image or moving image search apparatus using the color space quantization description information.

As depicted in FIG. 1, it comprises an query part 101, a retrieval part 102, a storage device 103, and a response part 104. Hereinafter, its operation will now be described in detail.

Herein, the query part 101, retrieval part 102, storage device 103, and response part 104 can be constructed with an assembly of a plurality of computers or storing apparatus connected to a computer or a communication apparatus.

First, a query that can be inputted by the query part 101 is a sample image for searching or an image pallet displaying schematically the feature of the color distribution of the query image.

Herein, the query part 101 is an input device such as a keyboard or a mouse to input the search request image of a user.

In addition, the query that can be inputted by the query part 101 may be a keyword describing the feature of the query image as a word or a sentence.

In addition, the query which can be inputted by the query part 101 can be stored as the form of the feature by using the other additional storing device, and when the query is the image which is represented by color information, it can be stored after the quantization of the color space. The retrieval part 102 comprises an image search engine, and selects one or more than one of images by comparing the query inputted by the query part 101 with the images stored on the storage device 103.

In other words, the retrieval part 102 extracts the image feature in the query inputted by the query part 101, and compares it with the features extracted from the images stored on the storage device 103.

After that, the retrieval part 102 selects at least one target image corresponding to the query according to the comparing result, and computes additionally numerical value which shows the degree of the correspondence to the query when there are a plurality of target images which correspond to the query. In addition, the retrieval part 102 compares the features of the query and the target images after performing the quantization of the color space on the image when the feature of the images is the color information.

After that, the query part 101 or storage device 103 compares the features extracted in advance when there is the feature extracted in advance from the query image or target images and there is no need the additional feature extraction.

The storage device 103 is for storing the images to be searched, it stores the feature information extracted in advance by extracting the image feature stored on the device.

In addition, the storage device 103 stores the original image after the quantization when the extracted feature information is about the color. Herein, the storage device 103 can be a plurality of storing devices connected to one storing device or one communication device.

The response part 104 can display the result images in order of the numerical value when there is a plurality of searched result images and they can find the numerical value corresponding to the query.

Herein, the response part 104 displays the result images searched in the retrieval part 102, and it can be constructed as a screen display device.

Figure 2:
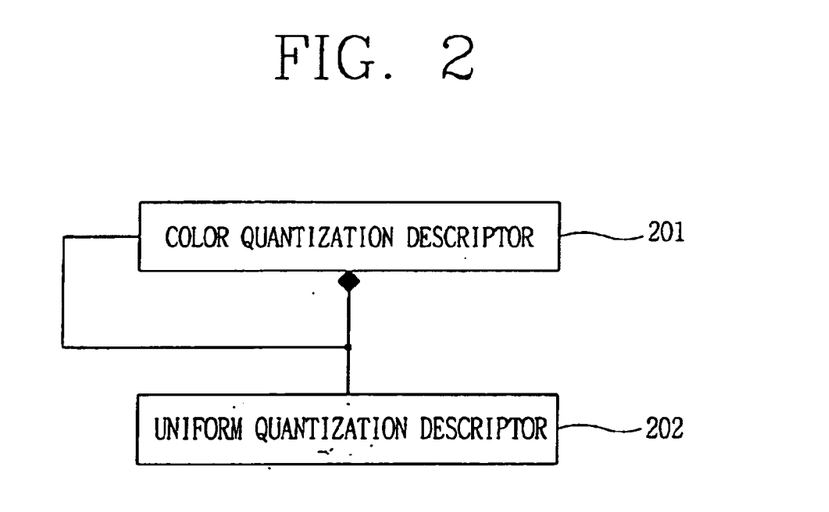
FIG. 2 illustrates a conceptual structure of a color space quantization descriptor in accordance with the present invention.

FIG. 2 illustrates a conceptual structure of the color space quantization descriptor in accordance with the present invention. In other words, it illustrates schematically the conceptual structure of the color space quantization descriptor according to the present invention used in the image search apparatus of FIG. 1.

First, in the color space quantization descriptor 201, one quantization descriptor comprises a uniform quantization descriptor 202.

In addition, in the color space quantization descriptor 201, the one quantization descriptor recursively comprises a plurality of quantization descriptors 201.

The quantization descriptor 201 describes the dimension of the color space and the uniform quantization descriptor 202 when the present color space is divided uniformly.

Meanwhile, the quantization descriptor 201 recursively describes the dimensions of the color space and the color space quantization descriptor 201 when the present color space is divided non-uniformly.

Accordingly, because the quantization descriptor 201 comprises the plurality of the quantization descriptors for the subordinate color space, a tree structure is formed.

Figure 3:
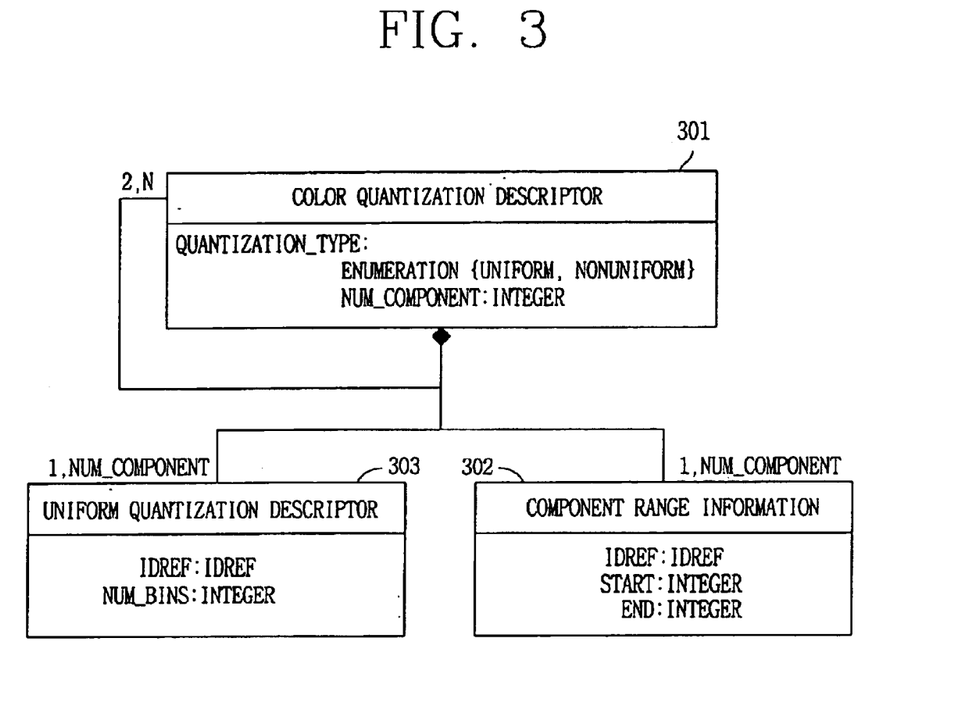
FIG. 3 illustrates a color space quantization description structure in accordance with the embodiment of the present invention.

FIG. 3 illustrates the color space quantization description structure in accordance with the embodiment of the present invention. In other words, it describes the embodiment of the color space quantization descriptor of FIG. 2.

As depicted in FIG. 3, the quantization descriptor 301 and component range information 302 correspond to the quantization descriptor 201 of FIG. 2, the uniform quantization descriptor 303 corresponds to the uniform quantization descriptor 202 of FIG. 2.

First, the quantization descriptor 301 comprises a quantization type (quantization_type), and a number of the component (num_component).

In addition, the quantization descriptor 301 recursively comprises the color space quantization descriptor or uniform quantization descriptor 303.

Herein, the quantization type describes by selecting at least one between the uniform quantization or non-uniform quantization. In addition, the quantization type describes whether the quantization of the subordinate color space of the present color space is performed uniformly or non-uniformly.

In addition, in the quantization type, the number of the component is described by an integer number, the integer number describes the dimension of the color space to be performed the quantization.

In other words, it is determined whether the color space quantization descriptor is described recursively below the present color space quantization descriptor or uniform quantization descriptor is described below the present color space quantization descriptor.

Accordingly, when the quantization type is uniform, the uniform quantization descriptor 303 is described more than 1 but less than the number of the component (num-component), the recursive color space descriptor is not comprised.

Meanwhile, when the quantization type is non-uniform, the color space quantization descriptor is described as same as the number of the subordinate color spaces to be divided, but the uniform quantization descriptor 303 is not described.

For example, when the quantization of the H, S, V color space is performed non-uniformly, the quantization descriptor 301 describes the quantization type as the non-uniform quantization, the number of the component is described as '3' meaning the dimension of the H, S, V color space. In other words, it describes the three dimensional color space of the H axis, S axis, V axis.

On the contrary, when the quantization of the H, S, V color space is performed uniformly, the uniform quantization descriptor 303 is described more than 1 and less than the number of the component 3.

The component range 302 describes the upper limit and lower limit of the range of the present color space, it is described as same as the number of the axis which contribute in forming the present color spaces, namely more than 1 and less than the number of the component (num_component).

In addition, the component range 302 describes information (idref) for representing the dividing color space axis and information (start, end) for representing a start position (value) and an end position (value).

For example, in order to describe the quantization by dividing the H, S, V color space with the V axis (0~255 range), the component range can be described as idref=V, start=0, end=100; idref=V, start=100, end=200; idref=V, start=200, end=255.

In addition, as described above, in the quantization on the H, S, V color space, the component number (num-component) is 3, the component range information 302 can be written more than 1 and less than 3. In other words, it can be described only about the V or it can be described about the V, H or it can be described about all the H, S, V.

The uniform quantization description 303 is written with the information (idref) for representing the dividing color space axis and number of division (num_bins), accordingly it describes the number of division in quantizing into subordinate space about the each color space axis.

Accordingly, when a three division quantization of the V axis of the H, S, V color space is performed, it can be described as the idref=V, num_bins=3.

Figure 4:
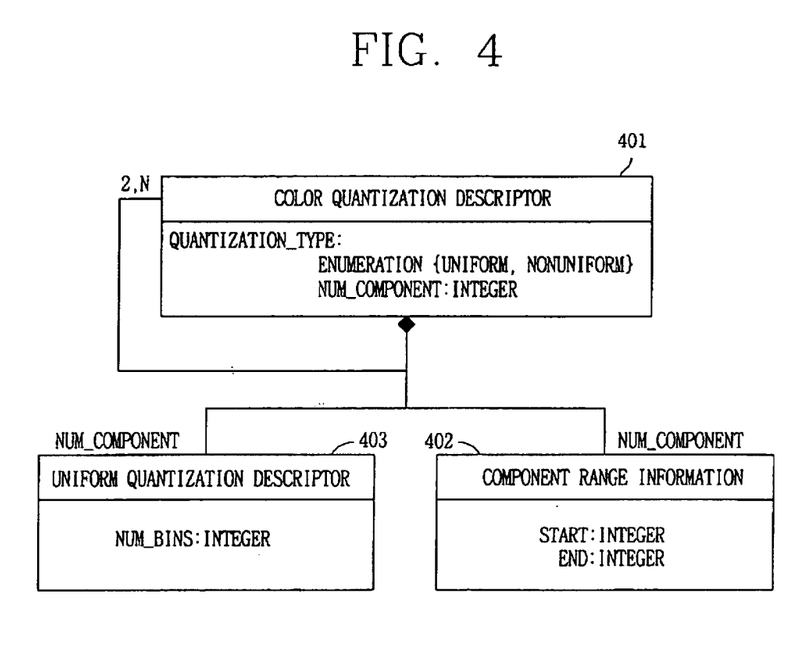
FIG. 4 illustrates a color space quantization description structure in accordance with the other embodiment of the present invention.

FIG. 4 illustrates a color space quantization description structure in accordance with the other embodiment of the present invention.

As depicted in FIG. 4, the quantization descriptor 401 and component range information 402 correspond to the quantization descriptor 201 of FIG. 2, and the uniform quantization descriptor 403 corresponds to the uniform quantization descriptor 202 of FIG. 2.

The quantization descriptor 401 comprises a quantization type (quantization_type), component number (num_component), and comprises recursively the color space quantization descriptor or uniform quantization descriptor 403 in accordance with the quantization type.

The quantization type is written by selecting at least one between the uniform quantization (uniform) and non_uniform quantization (non-uniform), and represents whether the quantization of the subordinate color space of the present color space is performed uniformly or non-uniformly.

In addition, in the quantization type, the component number is described with the integer number, and this number describes the dimension of the color space to be performed the quantization.

In other words, it is determined whether the color space quantization descriptor is described recursively below the present color space quantization descriptor or uniform quantization descriptor is described below the present color space quantization descriptor in accordance with the quantization type of the quantization descriptor 401.

Accordingly, when the quantization type is uniform, the uniform quantization descriptor 403 is described as same as the component umber (num_component), and the recursive color space descriptor is not comprised.

In addition, when the quantization type is non-uniform, the color space quantization descriptor is described as same as the number of the subordinate color space to be divided, accordingly the uniform quantization descriptor 403 is not described.

For example, when the quantization of the H, S, V color space is performed non-uniformly, the quantization descriptor 401 represents the quantization type as the non-uniform quantization, the component number is represented as '3' meaning the dimension of the H, S, V color space. In other words, it displays the three dimensional color space of the H axis, S axis, V axis.

On the contrary, when the quantization of the H, S, V color space is performed uniformly, the uniform quantization descriptor 403 is written as '3'.

The component range 402 represents the upper limit and lower limit of the present color space range, describes as same as the component number (num_component), namely, as same as the number of the axis divided in forming of the subordinate color space, and describes the start, end information for displaying the start position (value) and end position (value) of the color space to be divided.

In addition, as described above, in the quantization of the H, S, V color space, the component number (num_component) is 3, the component range information 402 can be written as 3 of the H, S, V.

The number of the division (num_bins) of the color space to be divided is described on the uniform quantization descriptor 403, accordingly it represents how many subordinate color space will be divided about the each color space axis below the present color space.

Figure 5:
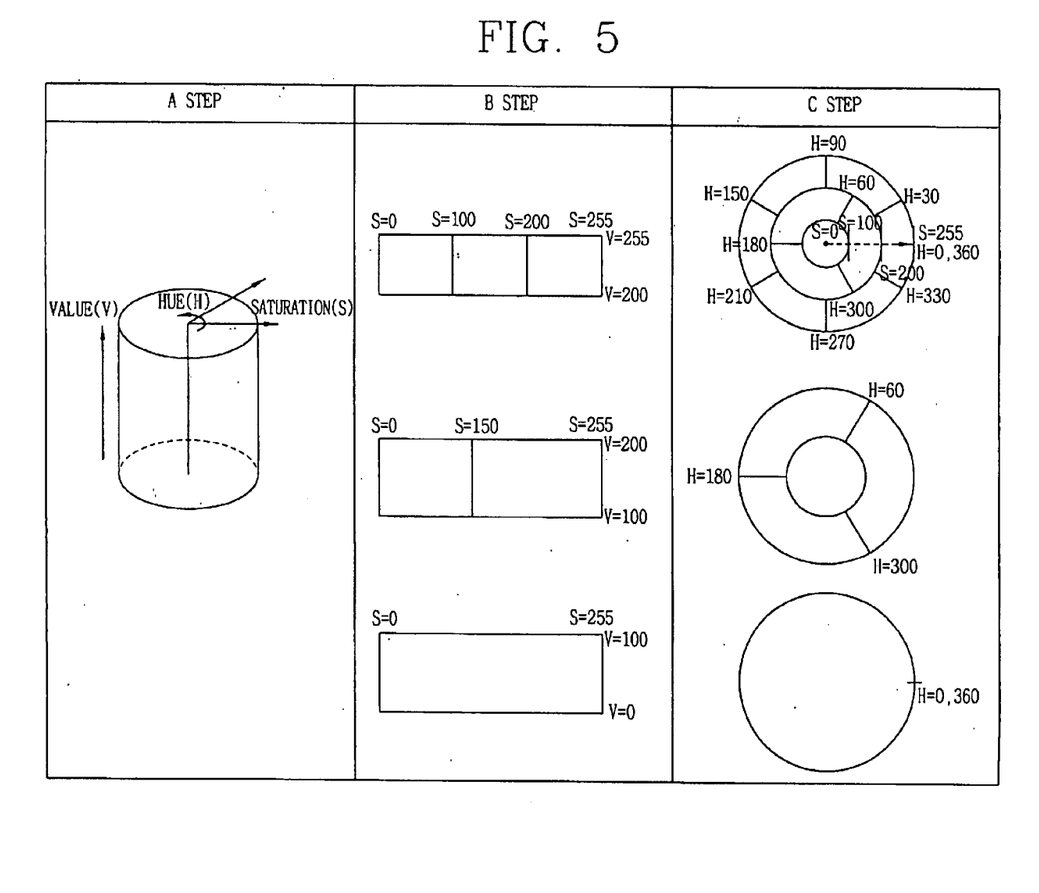
FIG. 5 illustrates the example of the color space quantization in accordance with the present invention.

FIG. 5 illustrates the example of the color space quantization in accordance with the present invention. In other words, it describes the description information about the H, S, V color space written by the quantization descriptor of FIG. 3 or FIG. 4 according to the present invention.

As depicted in FIG. 5, the quantization of the H, S, V color space into the sixteen subordinate color spaces is performed. In other words, the limit range of the each subordinate space of the color space is described.

First, step A represents the overall H, S, V color space (H=0~360, S, V=0~255). In other words, it comprises the quantization of the H (Hue), S (Saturation), V (Value) three dimensional (three axis) color space, accordingly the component number (num_component) written in the quantization descriptor is '3'.

Step B represents a first level of subordinate color spaces. In other words, the color space is divided into three divisions about the V axis as V=0 (start)~V=100 (end), V=100 (start)~V=200 (end), V=200 (start)~V=255 (end).

In addition, in the subordinate color space of V=100~V=200, it is divided into two divisions as the range of S=0 (start)~S=255 (end) in the subordinate color space V=0~V=100, as S=0 (start)~S=150 (end) and S=150 (start)~S=255 (end).

In addition, in the subordinate color space of the V=200~V=255, it is divided into two divisions as S=0 (start)~S=100 (end), S=100 (start)~S=200 (end), S=200 (start)~S=255 (end).

Figure 6:
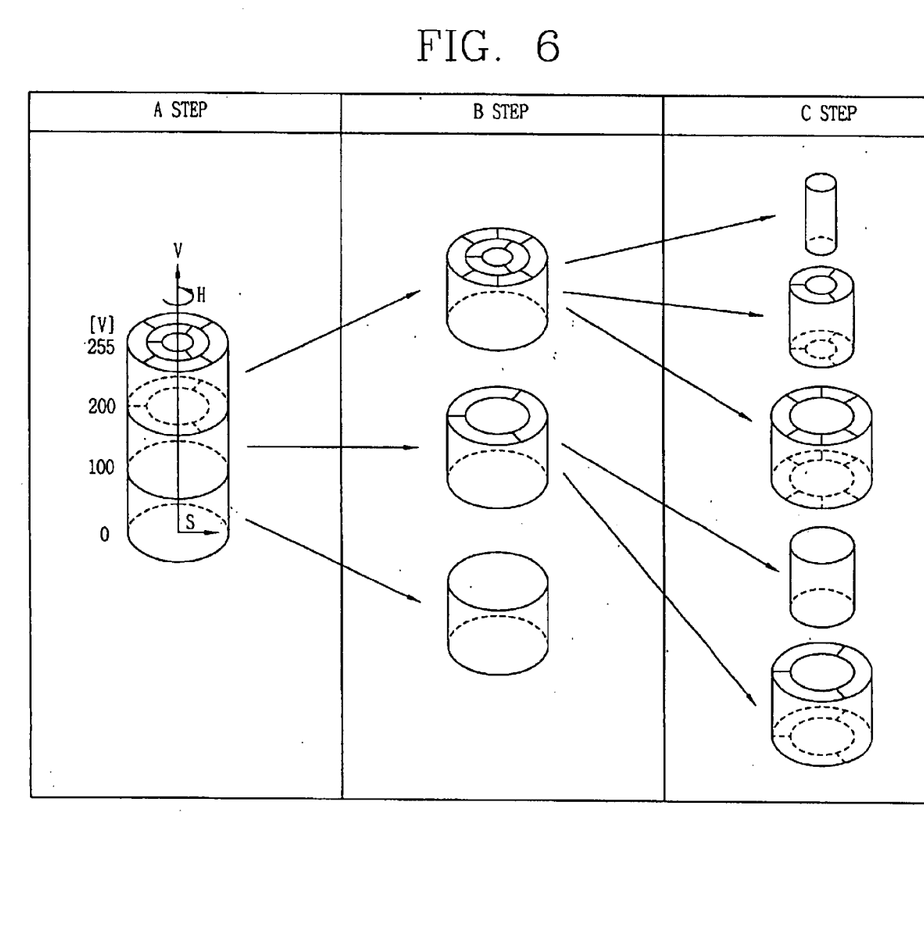
FIG. 6 illustrates the example of the color space quantization of FIG. 5 as a three dimension.

Step C represents the second level of subordinate color spaces. In other words, in the divided subordinate color space of V=200~V=255 and S=0~S=100 the division is performed to the H axis. In addition, the three division is performed about S=100~S=200 to the H axis as 60°, 180°, 300°. In addition, the six divisions of FIG. 6 are performed about the S=200~S=255 to the H axis as 30°, 90°, 150°, 210°, 270°, 330°, accordingly total 10 divisions of the subordinate color space are performed.

In addition, in the step C, divisions are performed in the H axis as 0°, 360° in the divided subordinate color space of V=100~V=200 and S=0~S=150, the three divisions are performed in the subordinate color space of S=150~S=255 to the H axis as 60°, 180°, 300°, and the H=0°, 360° color spaces constitute in the subordinate color space of the V=0~V=100.

Hereinafter, describing the color space quantization description information of FIG. 5 on the quantization descriptor of FIG. 3 will now be described in detail.

First, the quantization type and component number in the quantization descriptor 301 in the step A color space are described as quantization_type=nonuniform, num_component=3.

In addition, the component range information 302 for the step A quantization description information is the three color space of H, S, V, accordingly it is written more than 1 and less than 3. Herein, it is described as start=0, end=360 about idref=H, start=0, end=255 about idref=S, and start=0, end= 255 about idref=V.

About the subordinate color space of the step B, the step C subordinate color space description information about the each V=200~V=255, V=100~V=200, V=0~V=100 is recursively described, and the component range information is described more than 1 and less than 3.

In other words, in the component information 302, in V=200~V=255 and S=0~S=100, it is described as idref=S, start=0, end=100, the uniform quantization, in V=200 V=255, S=0~S=100, H=0,360 (division number 1), accordingly the uniform quantization description information 303 is described as idref=H, num_bins=1.

In addition, in the component range information 302, in V=200~V=255 and S=100~S=200, it is described as idref= S, start=100, end=200, the uniform quantization, in V=200~V=255 and S=100~S=200, H=60, 180, 300 (division number 3), accordingly the uniform quantization description information 303 is described as idref=H, num_bins=3.

In addition, in the component range information 302, in V=200~V=255 and S=100~S=200, it is described as idref= S, start=200, end=255, the uniform quantization, in V=200~V=255 and S=200~S=255, H=30, 90, 150, 210, 270, 330 (division number 6), accordingly the uniform quantization description information 303 is described as idref=H, num_bins=6.

Meanwhile, in the component range information 302, in V=100~V=200 and S=0~S=150, it is described as idref=S, start=0, end=150, the uniform quantization, in V=100~V= 200 and S=0~S=150, H=0, 300 (division number 1), accordingly the uniform quantization description information is described as idref=H, num_bins=1.

In addition, in the component range information 302, in V=100~V=200 and S=150~S=255, it is described as idref= S, start=150, end=255, the uniform quantization, in V=100~V=200 and S=150~S=255, H=60, 180, 300 (division number 3), accordingly the uniform quantization description information 303 is described as idref=H, num_bins=3.

Meanwhile, in the component range information 302, in V=0~V=100 and S=0~S=255, it is described as idref=V, start=0, end=100, the uniform quantization, H=0,360 (division number 1), accordingly the uniform quantization description information 303 is described as idref=H, num_bins=1.

FIG. 5 with the quantization descriptor of FIG. 3 can be described with a XML schema (Extensible Markup Language Schema) as below.

```
<ColorQuantizationD
Quantization="non-uniform"NumComponents="3">
    <ComponentRange idref="H" start="0" end="360"/>
    <ComponentRange idref="S" start="0" end="255"/>
    <ComponentRange idref="V" start="0" end="255"/>
    <ColorquantizationD>
        <ComponentRange idref="V" start="200" end="255">
        <colorQuantizationD Quantization="uniform">
            <ComponentRange idref="S" start="0" end="100">
            <bin_number idref="H">1</bin_number>
```

```
        </ColorQuantizationD>
        <ColorquantizationD Quantization="uniform">
            <ComponentRange idref="S" start="100" end="200">
            <bin_number idref="H">3</bin_number>
        </ColorquantizationD>
        <ColorQuantizationD Quantization="uniform">
            <ComponentRange idref="S" start="200" end="255">
            <bin_number idref="H">6</bin_number>
        </ColorQuantizationD>
    </ColorQuantizationD.
    <colorQuantizationD>
        <ComponentRange idref="V" start="1 00" end="200">
        <ColorQuantizationD quantization="uniform">
            <ComponentRange idref="S" start="0" end="150">
            <bin_number idref="H">1</bin_number>
        </ColorQuantizationD>
        ,colorQuantizationD Quantization="uniform">
            <ComponentRange idref="S" start="150" end="255">
            <bin_number idref="H">3</bin_number>
        </Colorquantization D>
    </ColorQuantizationD>
    <colorQuantizationD Quantization="uniform">
        <ComponentRange idref="V" start="0" end="100">
        <bin_number idref="H">1</bin_number>
    </ColorQuantization D>
</ColorQuantizationD>
```

Hereinafter, describing the color space quantization description information of FIG. 5 on the quantization descriptor of FIG. 4 will now be described in detail.

First, the quantization type and component number described on the quantization descriptor 401 about the step A color space are described as quantization_type=non-uniform, num_component=3.

In addition, the component range information for the step A quantization description information is described as 3 because it is the three dimensional color space of the H, S, V. Herein, it is described as start=0, end=360, start=0, end=255, start=0, end=255 about the each H, S, V.

About the subordinate color space of the step B, the description is performed about H=0~H=360, S=0~S=255, V=200~V=255 color space, H=0~H=360, S=0~S=255, V=100~V=200 color space, H=0~H=360, S=0~S V=0~V= 100 color space.

In addition, in the H=0~H=360, S=0~S=255, V=200~V= 255 color space, the subordinate color space description is performed about S=0~S=100, S=100~S=200, S=200~S= 250, and the subordinate color space description about the step C (H axis division) is performed.

In addition, in the H=0~H=360, S=0~S=255, V=100~V= 200 color space, the subordinate color space description about S=0~S=150, S=150~S=255 is performed, and the subordinate color space description about the step C (H axis division) about the each is performed.

In addition, in the H=0~H=360, S=0~S=255, V=0~V=100 color space, the subordinate color space description about S=0~S=255 is performed, and the subordinate color space description about the step C (H axis division) about the each is performed.

As described above, the range about the each subordinate color space is described in the component range information 402, and the bin number related to the uniform quantization is described in the uniform quantization descriptor 403 as same as the component number.

The bin number described in the component range information 402 about the each quantization space and uniform quantization description information 403 is similar with the case of FIG. 3. On the contrary, it is different the component range information 402 is described all as same as the component number (num_component).

Writing FIG. 5 with the quantization descriptor of FIG. 4 can be described with the XML schema as below.

```
<ColorQuantizationD
Quantization="non_uniform"NumComponents="3">
    <ComponentRange>
        <start> 0 </start> <end> 360 </end>
        <start> 0 </start> <end> 255 </end>
        <start> 0 </start> <end> 255 </end>
    </ComponentRange>
    <ColorQuantizationD>
        <ComponentRange>
            <start> 0 </start> <end> 360 </end>
            <start> 0 </start> <end> 255 </end>
            <start> 200 <start> <end> 255 </end>
        </ComponentRange>
        <ColorQuantizationD quantization="uniform">
            <ComponentRange>
                <start> 0 </start> <end> 360 </end>
                <start> 0 </start> <end> 100 </end>
                <start> 200 </start> <end> 255 </end>
            </ComponentRange>
            <bin_number> 1 </bin_number>
            <bin_number> 1 </bin_number>
            <bin_number> 1 </bin_number>
        </ColorQuantizationD>
        <ColorQuantizationD quantization="uniform">
            <ComponentRange>
                <start> 0 </start> <end> 360 </end>
                <start> 100 </start> <end> 200 </end>
                <start> 200 </start> <end> 255 </end>
            </ComponentRange>
            <bin_number> 3 ,/bin_number>
            <bin_number> 1 <bin_number>
            <bin_number> 1 </bin_number>
        </Colorquantization D>
        <colorQuantizationD Quantinization="uniform">
            <ComponentRange>
                <start> 0 </start> <end> 360 </end>
                <start> 200 </start> <end> 255 </end>
                <start> 200 </start> <end> 255 </end>
            </ComponentRange>
            <bin_number> 6 </bin_number>
            <bin_number> 1 </bin_number>
            <bin_number> 1 </bin_number>
        </ColorquantizationD>
    </colorquantization D>
    <ColorQuantizationD>
        <ComponentRange>
            <start> 0 </start> <end> 360 </end>
            <start> 0 </start> <end> 255 </end>
            <start> 100 </start> <end> 200 </end>
        </ComponentRange>
        <ColorQuantizationD Quantization="uniform">
            <ComponentRange>
                <start> 0 </start> <end> 360 </end>
                <start> 0 </start> <end> 150 </end>
                <start> 100 </start> <end> 200 </end>
            </ComponentRange>
            <bin_number> 1 </bin_number>
            <bin_number> 1 </bin_number>
            <bin_number> 1 </bin_number>
        </ColorquantizationD>
        <ColorQuantization>
            <ComponentRange quantization="uniform">
                <start> 0 </start> <end> 360 </end>
                <start> 0 </start> <end> 360 </end>
                <start> 0 </start> <end> 360 </end>
            </ComponentRange>
            <bin_number> 3 </bin_number>
            <bin_number> 1 </bin_number>
            <bin_number> 1 </bin_number>
        </ColorQuantization D>
        </ColorQuantization>
        <ColorQuantizationD Quantization="uniform">
            <ComponentRange>
```

-continued

```
                <start> 0 </start> <end> 360 </end>
                <start> 0 </start> <end> 360 </end>
                <start> 0 </start> <end> 360 </end>
            </ComponentRange>
            <bin_number> 1 </bin_number>
            <bin_number> 1 </bin_number>
            <bin_number> 1 </bin_number>
        </ColorQuantizationD>
</ColorQuantizationD>
```

FIG. 6 illustrates the example of the color space quantization of FIG. 5 as a three dimension. In other words, the component range of the subordinate color space is described in the component range information as described in FIG. 3 or FIG. 4.

Figure 7:
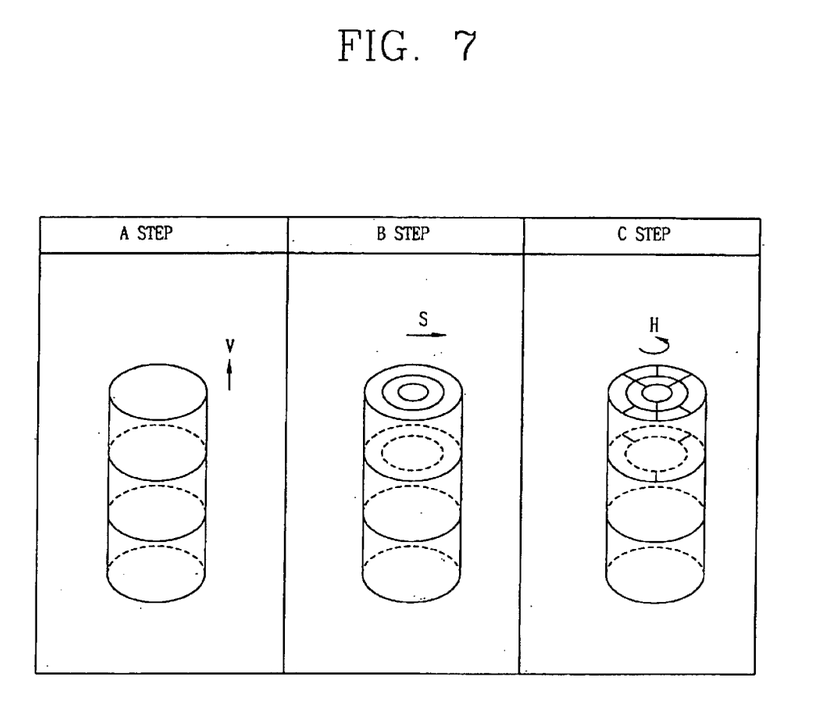
FIG. 7 illustrates the example of a three-step quantization of H, S, V color space of FIG. 5.

FIG. 7 illustrates the example of the three-step quantization of H, S. V color space in accordance with FIG. 5. In other words, FIG. 7 illustrates it is possible to perform a scalable subordinate color space usage about the color space quantization of FIG. 5 through the recursive tree structure quantization according to the present invention.

For example, when the quantization of the H, S, V color space is performed with the three step (A, B, C), the quantization of the set of the color space descriptor described in the each step about the one perfect H, S, V color space is performed.

In other words, the H, S, V color space is divided with the V axis in the step A, is divided with the S axis in the step B, and is divided with the H axis in the step C. Herein, the descriptor set described in the each step performs more detailed quantization while proceeding the step A, B and C.

Accordingly, in case of the coarse quantization request, only the quantization descriptor information described in the step A is used, and the quantization descriptor of the step B and C can not be used.

In addition, once the color space descriptor is described through the quantization descriptor, the color space quantization less detailed the maximum detailed quantization color space can be gotten without the additional description or operation.

Accordingly, the quantization can be performed by using the quantization description information in accordance with the feature of the moving image or still image, accuracy of the search, or by using the different quantization description information corresponding to the each feature.

For example, in the schematic search request, the quantization is performed by matching to the step B. In addition, in the accurate search request, the quantization is performed by matching to the step C.

In other example, more detailed quantization is performed about V=200~V=255 range among the subordinate color space by performing the step C quantization. In addition, the less detailed quantization is performed about V=0~V=200 range by performing the step B quantization, accordingly the present invention can adapt the different quantization step in accordance with the each feature.

Figure 8:
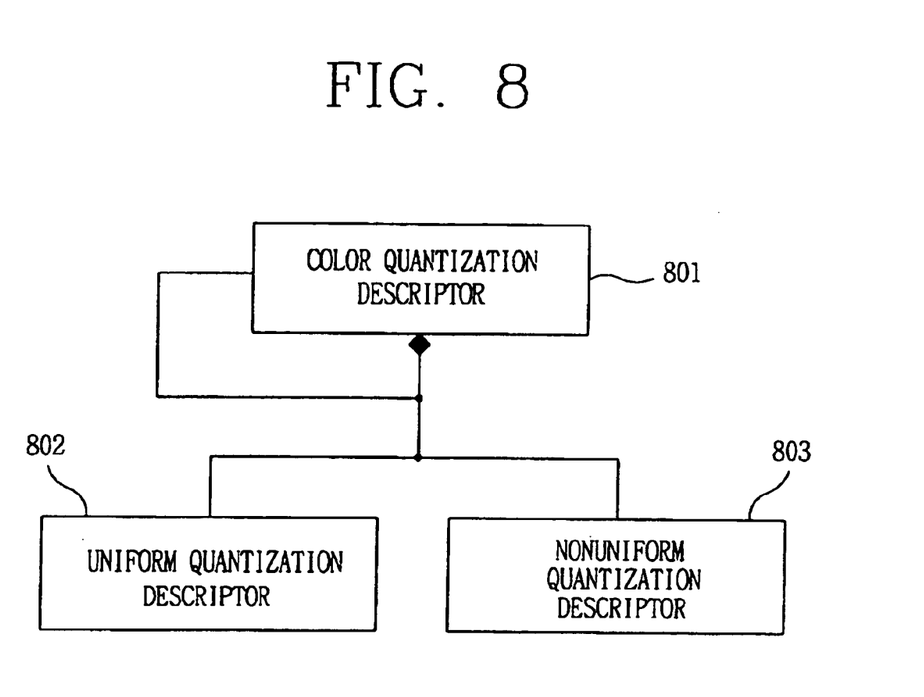
FIG. 8 illustrates a conceptual structure of a color space quantization description structure in accordance with the another embodiment of the present invention

FIG. 8 illustrates a conceptual structure of a color space quantization description structure in accordance with the another embodiment of the present invention As depicted in FIG. 8, a color space quantization descriptor 801 comprises a uniform quantization descriptor 802 and a non-uniform quantization descriptor 803.

In addition, the color space quantization descriptor 801 recursively comprises a plurality of color space quantization descriptors 801, and therefore the color space quantization descriptor 801 can have a recursive tree structure.

In addition, when subordinate color space of the present color space is uniformly divided, the color space quantization descriptor 801 describes the uniform quantization descriptor 802, when subordinate color space of the present color space is non-uniformly divided, the color space quantization descriptor 801 describes the non-uniform quantization descriptor 803.

Accordingly, the quantization descriptor 801 has a tree structure by comprising a plurality of subordinate quantization descriptors.

Figure 9:
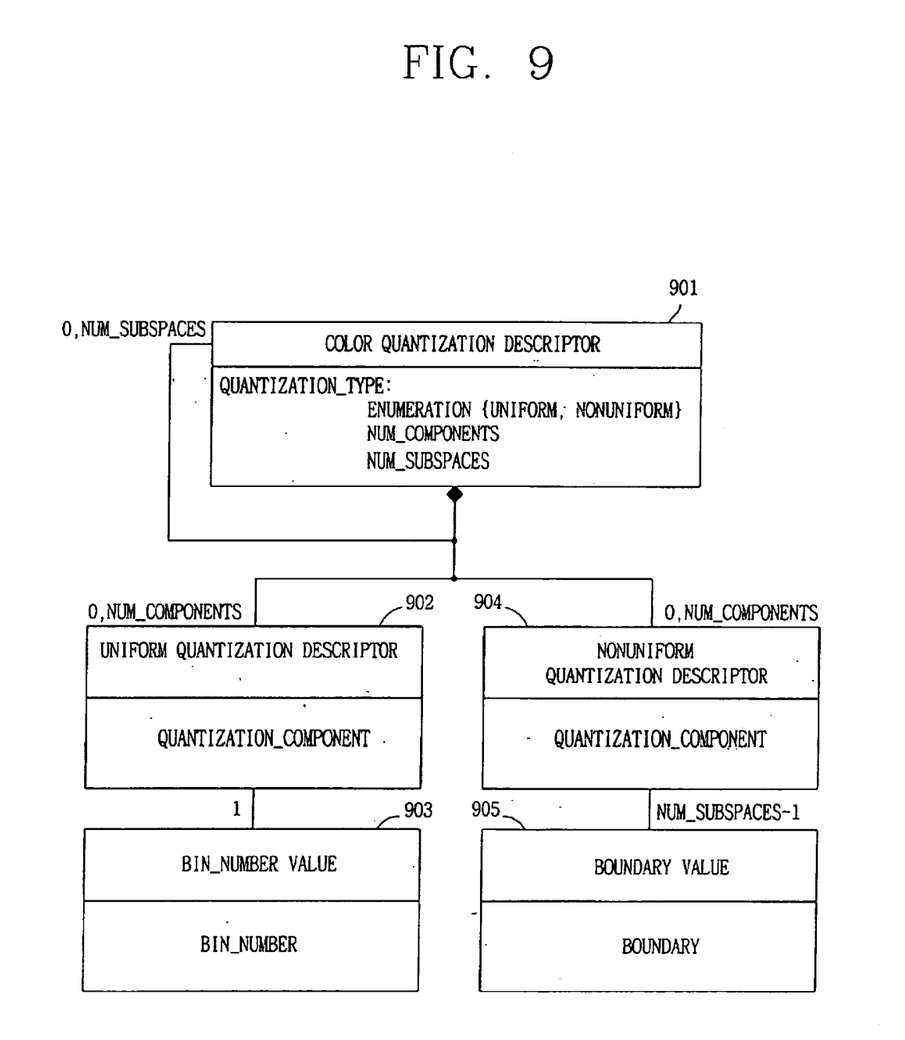
FIG. 9 illustrates a color space quantization description structure of FIG. 8 in accordance with the another embodiment of the present invention.

FIG. 9 illustrates a color space quantization description structure of FIG. 8 in accordance with the another embodiment of the present invention.

As described in FIG. 9, a quantization descriptor 901 comprises quantization type information (quantization_type), information about number of component (nun_component), and information about number of subordinate color space (num_subspaces). In addition, the quantization descriptor 901 recursively has color space quantization descriptor at least 0 and not greater than the number of subordinate color space (num_subspaces), and has a uniform quantization descriptor 902 or a non-uniform quantization descriptor 904 in accordance with the quantization type.

The uniform quantization descriptor 902 describes more than 0 and not greater than the number of the component (num_component), and comprises a quantization component (quantization_component) and subordinate bin number value information 903 for describing number of bin.

On the contrary, the non-uniform quantization descriptor 904 describes more than 0 and not greater than the number of the component (num_component), and comprises the quantization component (quantization_component) and subordinate boundary value information 905 for describing boundary of subordinate color space as same as the number of the color space-1.

As described above, the present invention can improve the ability of the still image and moving image search apparatus by performing the color space quantization efficiently.

In addition, when the present invention is adapted to the search apparatus for searching large capacity image storing apparatus, it can perform the search promptly in search of the multimedia based on the contents.

In addition, when the preset invention is adapted to a text based search apparatus, the user can easily search the request image content by using the present invention additionally.

In addition, the present invention can perform the quantization about the general n dimensional color space such as the H, S, V RGB, HMMD (Hue/Min/Max/Difference) color space.

In addition, in the present invention, a certain set of consecutive color space is formed in the overall subordinate color space structure constructed as a tree, the overall color space can be described with the set, accordingly the different quantization can be performed in accordance with the feature.

In addition, in the present invention, there is a plurality of the certain sets of the consecutive color spaces in the overall subordinate color space structure constructed as the tree, accordingly the scalable quantization description in order of the volume of the limit range of the color space within the certain sets can be performed.

For example, the quantization can be performed corresponding to the user request such as the schematic search or accurate search etc. by matching to a certain step among the plurality of the subordinate trees, and the combination of them is possible, accordingly the present invention can perform the quantization adaptively, variably, and selectively.

What is claimed is:

1. A color space quantization descriptor structure for performing quantization of a color space in order to search a multimedia based on contents, in which quantization description information of the color space has a tree structure divided into a plurality of superior color spaces and subordinate color spaces when color information is described as the information representing a feature of an image, the quantization description information comprising information for describing uniform quantization of subordinate color space and information for describing non-uniform quantization of the subordinate color space, wherein the information for describing the uniform quantization describes bin values of the subordinate color space, and the information for describing the non-uniform quantization describes at least one boundary between the subordinate color spaces.

2. The color space quantization descriptor structure according to claim 1, wherein the quantization description information represents one color space and further comprises a plurality of subordinate color spaces repeatedly.

3. The color space quantization descriptor structure according to claim 1, wherein the subordinate color space structure of the quantization description information constitutes a certain set of consecutive color spaces.

4. The color space quantization descriptor structure according to claim 3, wherein the subordinate color space structure of the quantization description information performs a scalable quantization description in order of volume of limit range of the color spaces within the certain set.

5. A color space quantization descriptor structure for performing quantization of a color space in order to search a multimedia based on contents, comprising:
   quantization description information of a color space having a tree structure dividing the color space into a plurality steps of superior color spaces and subordinate color spaces, wherein the quantization description information includes:
   information for representing the number of components constituting the color space;
   information for representing the limit range of the each divided color space; and
   information for representing the division number of the color space when the uniform quantization is represented, wherein the information for representing the limit range of the color space and information for representing the division number of the uniform quantization color space include information for representing the pertinent axis of the color space and are described as the number more than 1 and less than the component number; and
   quantization type information for representing uniform quantization or non-uniform quantization when color information is described as the information representing a feature of an image in order to search a multimedia based on contents.

6. A color space quantization descriptor structure for performing quantization of a color space, in which quantization description information of the color space has a tree structure divided into a plurality of superior color spaces and subordinate color spaces when color information is described as the information representing a feature of an image, describes the number of subordinate color spaces, comprises information for describing uniform quantization and information for describing non-uniform quantization, wherein the information for describing the uniform quantization describes the number of bins of the subordinate color space, and the information for describing the non-uniform quantization describes a boundary value of the subordinate color space.

7. The color space quantization descriptor structure according to claim 6, wherein the quantization description information of the color space further comprises information for describing the number of components constituting the color space.

8. The color space quantization descriptor structure according to claim 6, wherein the quantization description information of the color space further comprises information for describing boundaries between the divided color spaces.

9. The color space quantization descriptor structure according to claim 8, wherein the information for describing the boundaries between the divided color spaces further comprise information for describing the pertinent axis of the color space.

10. The color space quantization descriptor structure according to claim 9, wherein the information for describing the boundaries between the divided color spaces is described as the number more than 0 and not greater than the component number.

11. The color space quantization descriptor structure according to claim 6, wherein the quantization description information of the color space further comprises information for describing a division number of the color space when the uniform quantization is described.

12. The color space quantization descriptor structure according to claim 11, wherein the information for describing the division number of the uniformly divided color spaces further comprise information for describing the pertinent axis of the color space.

13. The color space quantization descriptor structure according to claim 12, wherein the information for describing the division number of the uniformly divided color spaces is described as the number more than 0 and not greater than the component number.

* * * * *